Patented June 30, 1942

2,287,917

UNITED STATES PATENT OFFICE 2,287,917

MANUFACTURE OF CATALYTIC MATERIAL

Charles L. Thomas and Joseph D. Danforth, Chicago, Ill., assignors to Universal Oil Products Company, Chicago, Ill., a corporation of Delaware No Drawing. Application August 23, 1940, Serial No. 353,896

5 Claims. (Cl. 252—259)

This invention relates to improvements in the manufacture of catalytic material suitable for accelerating reactions among hydrocarbons to produce large yields of high antiknock gasoline. In general, it has reference to a method of producing granular particles of refractory catalytic material from mixtures of hydrous oxides. The hydrous oxide mixtures are prepared by definite procedures so that the catalysts will have high activity for prolonged use under high temperature conditions of processing and regeneration.

Various methods are employed in forming catalytic material into granules of suitable size and shape for contacting with the reacting materials. These methods include such operations as extruding, briquetting, pelleting, and pressing into cakes with subsequent crushing and screening. The equipment for these methods requires mechanical attention, particularly the pelleting presses where the maintenance cost is high and the production rate is relatively slow. It is also necessary in each of these methods to give special consideration to obtaining a uniform and suitable physical condition of the feed material. Frequently an organic lubricant is also added which is removed by subsequent calcination. It is among the objects of this invention to avoid the above methods of making granular masses and the corresponding high equipment and operating costs. Advantage is taken of the fact that when a paste is made from the catalyst gels it cracks upon drying in a manner that can be controlled to regulate the size of the particles resulting therefrom.

In one specific embodiment, the present invention is an improvement in the manufacture of catalysts suitable for use in hydrocarbon conversion reactions to produce substantial yields of gasoline having high antiknock value which comprises forming granular particles of synthetically composited cracking catalyst gels by making an aqueous slurry thereof having a paste-like consistency, disposing the slurry in trays in uniform, relatively thin layers and drying preliminary at a slow drying rate and finally at high temperature.

A large number of hydrated oxides have been composited or compounded with silica hydrogels according to various procedures whereby composites are formed which are useful as catalysts in numerous reactions such as hydrogenation, oxidation, and other types as well as in hydrocarbon cracking reactions. These composites include various oxides such as those of aluminum, chromium, cobalt, manganese, nickel, copper, thorium, molybdenum, titanium, vanadium, zirconium and others. Although the method of the invention is applicable to the preparation of granular material from composites of these hydrous oxides with hydrated silica, it is particularly directed to preparations of precipitated hydrated silica with hydrous oxides such as alumina and/or zirconia which are especially active in catalyzing hydrocarbon conversion reactions.

Numerous methods may be employed when preparing the synthetic catalysts which are subsequently granulated according to the present invention. The components may be separately, concurrently, or consecutively precipitated. Generally speaking, the primary and major component is a precipitated hydrated silica which is intimately mixed with a precipitated hydrous metal oxide such as alumina, zirconia or mixtures thereof present in minor proportions. According to one general method of preparation, the hydrated silica may be precipitated from a dilute solution of commercial water glass and subsequently mixed with the remaining hydrous oxide components in any suitable manner. The precipitated hydrated silica may for example be suspended in a solution of a metal salt and a hydrous oxide of the corresponding metal precipitated in the presence of the suspended hydrated silica by the addition of a suitable alkaline precipitant such as ammonium hydroxide. Various other procedures may be followed wherein these components are co-precipitated, or precipitated in different steps and the components intimately commingled. The hydrated silica may also be heated in the presence of solutions of the metal salts so as to deposit hydroxides in the gel structure of the hydrated silica by hydrolysis, or the precipitated hydrated silica may be mixed with a relatively concentrated solution of a metal salt to subsequently form the corresponding metal oxide in the slurry which is made and dried in accordance with the present invention.

In order to prepare stable refractory catalysts it is necessary where sodium compounds have been used at some stage in the preparation of the catalystic material to subequently treat it in order to remove alkali metal impurities. This may be accomplished by washing with various acid and salt solutions, preferably before making it into the granular masses. The composite may then consist of mixtures of hydrated silica with other hydrous oxides such as those of aluminum, zirconium, vanadium, thorium, chromium, or of other metals which yield hydrated oxides having catalytic and adsorbent properties. Various proportions of the hydrated oxides may be present in the finished product, the more frequent practice however being to have minor proportions of added hydrated oxides and major proportions of hydrated silicon dioxide. Thus, in the preparation of highly porous silica-alumina catalysts 5 to 30% of hydrated alumina is distributed and very intimately disposed in and on the surface, 95 to 70% of hydrated silicon dioxide. Smaller and larger proportions of alumina and/or zirconia, or other hydrous oxides may also be similarly used but not with equivalent catalytic effects.

The above catalyst composites are generally recovered as a gel and in the form of a filter cake which is ordinarily either extruded into shaped particles for drying or else dried and then shaped into granular masses by pilling or pressing under high pressures. According to the practice of this invention, the gel composite is made into a paste and heated under regulated conditions so as to dry and shrink with the formation of cracks which cause the material to break up into irregular granules of definite mesh sizes. It is not sufficient to just dry the lumps of the gel filter cake since large and small lumps with cracks are then formed which break up into a large proportion of fines. The fines cannot be mixed with further amounts of gel and dried without constantly increasing the amount of fines produced. It has been found that very high recoveries of usable granular catalyst can be obtained when the gel cake is dried in the form of a small thin paste as is obtained, for example, by uniformly thinning a gel filter cake with water to form a slurry. This slurry may then be pumped in and uniformly spread in the trays of a drying oven, and dried under rather moderate conditions. Layers ½ and 1 inch thick have been used and layers up to 2 inches or more may be employed. During this drying period the paste shrinks considerably in volume and in so doing develops predominantly vertical cracks in the dry material. This shrinkage and cracking causes the granulation of the mass, leaving only a small percentage of large oversize granules for crushing treatment. The drying rates employed are relatively slow and the temperature employed is as low as 150–160° F. The final drying powder may be carried on at temperatures of approximately 225–300° F. It has been found in the drying of the gel slurries that the mesh size can be controlled by either or both the thickness of the layers employed and the gel concentration in the slurry. The dried granules are then screened and calcined at temperatures ranging from 1200–1600° F.

These catalysts may be conveniently utilized in carrying out various types of hydrocarbon conversion reactions when employed as filling material in tubes or chambers and particularly when disposed in trays in the catalytic reactors. A hydrocarbon oil fraction is usually heated to substantially a reaction temperature and the hydrocarbon vapors contacted with the stationary catalyst masses. The hydrocarbon vapors may be passed downward through the catalyst and particularly where larger beds of catalyst are involved, the passage of vapors may be restricted to definite paths rather than to allow the vapors to have unrestricted contact. Where this method is used, the temperature of the contact materials while in use and during regeneration may be controlled by various operating procedures by heat interchange devices. After the oil vapors have been contacted with the catalyst as in catalytic cracking, for example, the products may be separated into high boiling fractions unsuitable for further cracking and/or insufficiently converted fractions which may be subjected to further cracking treatment and the gasoline and gaseous products. The higher boiling fractions may be removed from the system, may be returned directly to admixture with the charging stock or may be processed in separate passes so as to ultimately obtain maximum utilization of the charging stock in producing the gasoline product.

Inasmuch as there is a deposition of carbonaceous material upon the catalyst surfaces, the catalysts are periodically regenerated. The regeneration is ordinarily carried out by switching the hydrocarbon vapors to active or regenerated catalyst in a separate bed or chamber, and directing a stream of heated oxygen-containing gases to the spent catalyst so as to burn up the carbonaceous material under regulated temperature conditions. It has been found that granular material prepared according to this invention is much more readily reactivated than corresponding material prepared by pelleting. The oxygen concentration in the reactivation gases can be approximately doubles and a major portion of the carbon may be burnt to carbon monoxide and therefore a much smaller heat of reactivation is obtained. The increase in the speed of reactivation of the catalyst is of course of great importance since it has a marked effect upon the capacity of the cracking plant.

The following specific examples are given to illustrate applications of the process of the invention, the activity of the catalyst preparation also being indicated. The invention should not be considered as limited to these examples of the process of manufacture or to these particular catalyst preparations since they are given as illustrations of the novelty and utility of the invention.

*Example I*

A catalytic material having the molar composition of $100SiO_2:2Al_2O_3:5ZrO_2$ is prepared for subsequent granulation as follows: A commercial water glass grade of sodium silicate containing approximately 28.5% silicon dioxide and 9% by weight of sodium oxide is diluted with approximately 10 volumes of water. Hydrochloric acid is gradually added while agitating until the mixture is slightly alkaline. The silica gel which forms is broken up and acid is further added and the pH is further regulated so as to obtain substantially complete precipitation. The silica gel is then washed and treated with acidulated water in order to substantially remove alkali metal impurities. The purified silica gel is then suspended in a dilute solution containing aluminum and zirconyl chlorides in amounts adequate to yield precipitated alumina and zirconia in the proportions above indicated upon the addition of ammonium hydroxide. After precipitation the slurry is filtered and approximately 20 gallons of filter press cake slurried in about 30 gallons of water to obtain a uniform paste of thin consistency. The resultant slurry is pumped onto dryer trays to a depth of approximately one inch and then dried at approximately 160° F. for approximately six hours. The granular catalyst resulting therefrom is principally of 4–12 mesh. This material is calcined for approximately one hour at 1500° F. before contacting with the hydrocarbon vapors.

*Example II*

Catalytic material having the molar composition of $100SiO_2:5Al_2O_3$ is prepared for granulation in a similar manner as in the above example except that an aluminum chloride solution only is used in the required amount rather than the combined solutions of aluminum and zirconyl chlorides. Of this gel filter cake, 20 gallons is slurried in approximately 30 gallons of water which is then pumped into the dryer trays to a depth of approximately ½ inch. It is then dried similarly as above and the dried product is chiefly of 6 to 20 mesh as a result of the thinner layer employed in the drying treatment. This product is also calcined at approximately 1500° F.

In a run made on 6-10 mesh granular material prepared as in Example I, a Mid-Continent crude oil distillate having a 32° A. P. I. gravity was vaporized and contacted with said granules. The average temperature is approximately 900° F., and pressure 27 pounds per square inch, and using two volumes of oil on the liquid basis hourly per volume of catalyst space. Gasoline having an A. P. I. gravity of 58 and a Reid vapor pressure of 8.5 was produced to the extent of 36.2% of the charging stock. The octane number was 77 and was increased to 84.5 by the addition of 3 cc. tetraethyl lead per gallon of gasoline. In comparison with ⅛ by ⅛ inch catalyst of similar composition, but formed by pilling the dried catalyst material, similar yields and quality of gasoline are obtained but the time of regeneration is considerably reduced when employing catalyst prepared according to this invention since the oxygen content of the reactivation gases used was approximately 6 to 7% as compared with about one half of this amount when employing pilled catalyst.

We claim as our invention:

1. A process for the manufacture of granular catalyst particles from synthetically composited gels which comprises making an aqueous slurry of said catalyst gels having a paste-like consistency, forming said catalyst slurry into a relatively thin uniform layer, shrinking under slow drying conditions at a temperature of approximately 150-200° F. to crack and form granular material larger than 20 mesh, and drying at an elevated temperature of approximately 225° to 300° F.

2. A process for the manufacture of granular catalyst particles from synthetically composited gels which comprises making an aqueous slurry of said catalyst gels having a paste-like consistency, forming said catalyst slurry into a uniform layer of less than approximately 2 inches thickness, shrinking under slow drying conditions at a temperature of approximately 150-200° F. to crack and form granular material larger than 20 mesh, and drying at an elevated temperature of approximately 225°-300° F.

3. In the manufacture of a granular catalyst from a mixed gel of a hydrated silica and a hydrous oxide capable of activating said hydrated silica in catalytic reactions, the improvement comprising forming said mixed gel into an aqueous slurry having a paste-like consistency, spreading said catalyst slurry into a uniformly thin layer not substantially in excess of 2 inches, shrinking under slow drying conditions at a temperature of approximately 150-200° F. to crack and form granular material larger than 20 mesh, and drying at an elevated temperature of approximately 250°-300° F.

4. A process for the manufacture of granular catalyst particles from synthetically composited gels which comprises making an aqueous slurry of said catalyst gels having a paste-like consistency, forming said catalyst slurry into a uniformly thin layer not substantially more than two inches in thickness, shrinking under slow drying conditions at a temperature of approximately 150-200° F. to form a granular material of a particle size greater than 20 mesh, further drying the resulting preshrunk material at a temperature of 225-300° F. and then calcining at a temperature above 1000° F.

5. The process of claim 4 further characterized in that the dried granular material is segregated according to particle size before calcining.

CHARLES L. THOMAS.
JOSEPH D. DANFORTH.